United States Patent
Kaashoek et al.

(10) Patent No.: US 9,723,663 B2
(45) Date of Patent: Aug. 1, 2017

(54) LIGHTING SYSTEM

(71) Applicant: PHILIPS LIGHTING HOLDING B.V., Eindhoven (NL)

(72) Inventors: Gerrit Hendrik Kaashoek, Eindhoven (NL); Hendrik Van Houten, Eindhoven (NL); Matthias Wendt, Würselen (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/646,751

(22) PCT Filed: Sep. 25, 2014

(86) PCT No.: PCT/EP2014/070423
§ 371 (c)(1),
(2) Date: May 22, 2015

(87) PCT Pub. No.: WO2015/052001
PCT Pub. Date: Apr. 16, 2015

(65) Prior Publication Data
US 2016/0212805 A1    Jul. 21, 2016

(30) Foreign Application Priority Data

Oct. 10, 2013 (EP) .................................. 13188176

(51) Int. Cl.
*H05B 33/08*    (2006.01)
*H05B 37/02*    (2006.01)

(52) U.S. Cl.
CPC ......... *H05B 33/0815* (2013.01); *H05B 37/02* (2013.01); *H05B 37/0218* (2013.01); *H05B 37/0227* (2013.01); *Y02B 20/46* (2013.01)

(58) Field of Classification Search
USPC ....... 315/86–90, 92, 93, 119, 121, 127, 160, 315/161, 172, 193, 200 R, 201, 205, 207,
(Continued)

(56) References Cited

U.S. PATENT DOCUMENTS

| | | |
|---|---|---|
| 4,874,962 A | 10/1989 | Hermans |
| 8,390,204 B1 | 3/2013 | Zagha |

(Continued)

FOREIGN PATENT DOCUMENTS

| | | |
|---|---|---|
| DE | 102012204284 A1 | 9/2013 |
| EP | 0794608 A2 | 9/1997 |

(Continued)

*Primary Examiner* — Douglas W Owens
*Assistant Examiner* — Jianzi Chen
(74) *Attorney, Agent, or Firm* — Akarsh P. Belagodu

(57) ABSTRACT

The invention relates to a lighting system (1) comprising a lighting device (3) for emitting light in a high-power mode and for providing a further function like a sensing function in a low-power mode and a switch (4) connecting the lighting device with a power supply (2). The switch is switchable between a high-power state, in which a higher power is provided to the lighting device via the switch, which allows the lighting device to emit the light in the high-power mode, and which may be regarded as being an ON state, and a low-power state, in which a lower power is provided to the lighting device via the switch, which allows the lighting device to provide the further function, and which may be regarded as being an OFF state. Thus, for instance, a sensing function can be provided, even if the switch is in its OFF state.

18 Claims, 5 Drawing Sheets

(58) Field of Classification Search
USPC ....... 315/217, 224, 225, 246, 287, 291, 295, 315/297, 306, 307, 308, 310, 312, 313, 315/315, 362
See application file for complete search history.

(56) References Cited

U.S. PATENT DOCUMENTS

| | | |
|---|---|---|
| 2006/0028156 A1 | 2/2006 | Jungwirth |
| 2007/0279491 A1 | 12/2007 | Riviere |
| 2008/0061634 A1 | 3/2008 | Iwata et al. |
| 2008/0304272 A1 | 12/2008 | Joasil et al. |
| 2010/0033117 A1 | 2/2010 | Chang |
| 2010/0045191 A1 | 2/2010 | Aendekerk |
| 2011/0133649 A1 | 6/2011 | Kreiner et al. |
| 2013/0063027 A1* | 3/2013 | Recker ............... H05B 33/0803 315/86 |

FOREIGN PATENT DOCUMENTS

| | | |
|---|---|---|
| EP | 1672810 A1 | 6/2006 |
| GB | 1434773 A | 5/1976 |
| GB | 2416251 A | 1/2006 |
| JP | 5091680 B2 | 4/1993 |
| JP | 2005234763 A | 9/2005 |
| WO | 9002472 A | 3/1990 |
| WO | 2008135942 A1 | 11/2008 |

* cited by examiner

LIGHTING SYSTEM

CROSS-REFERENCE TO PRIOR APPLICATIONS

This application is the U.S. National Phase application under 35 U.S.C. §371 of International Application No. PCT/EP2014/070423, filed on Sep. 25, 2014, which claims the benefit of European Patent Application No. 13188176.5, filed on Oct. 10, 2013. These applications are hereby incorporated by reference herein.

FIELD OF THE INVENTION

The invention relates to a lighting system, a switch for being used in the lighting system and an upgrade device for upgrading a switch of a lighting system.

BACKGROUND OF THE INVENTION

Known lighting systems comprise a power supply like a mains power supply, lamps like incandescent bulbs, and a switch electrically connected between the power supply and the lamps, wherein the switch is adapted such that it can be operated in an ON state and in an OFF state. In the ON state the power supplied by the power supply is provided to the lamps and in the OFF state the power is not provided to the lamps. In such a lighting system a lamp, which only provides the function of emitting light and no further functions requiring electrical power, may be replaced by another lamp, which provides the light emission function and also an additional function like a sensing function that should be active also if light is not emitted. If after this replacement the switch is in its OFF state, not only the light emission function of the new lamp is switched off, but also the additional function which should be still active. The lighting system does therefore not allow the new lamp to provide its full functionality.

SUMMARY OF THE INVENTION

It is an object of the present invention to provide a lighting system, which allows a lighting device to provide its full functionality. It is a further object of the present invention to provide a switch for being used in a lighting system and an upgrade device for upgrading a switch of a lighting system, which allow a lighting device of a lighting system to provide its full functionality.

In a first aspect of the present invention a lighting system is presented, wherein the lighting system comprises:

a lighting device to be powered by a power supply, the lighting device being adapted to emit light in a high-power mode and to provide a further function in a low-power mode, the power supply for powering the lighting device, and a switch electrically connecting the lighting device with the power supply, wherein the switch is switchable between a high-power state, in which a higher power is provided to the lighting device via the switch, which allows the lighting device to emit the light in the high-power mode, and a low-power state, in which a lower power is provided to the lighting device via the switch, which allows the lighting device to provide the further function.

Since the switch is adapted to, in the low-power state, provide the lower power to the lighting device, which allows the lighting device to provide the further function, the lighting device can provide the further function, even if the switch is actuated to switch off the light emission. This allows the lighting device to provide its full functionality.

The high-power state can be regarded as being an ON state, in which the lighting device emits the light, and the low-power state can be regarded as being an OFF state, in which the light emission of the lighting device is switched off, but in which the lighting device can still provide its further function.

The further function may be a sensing function, a processing function, a communication function or any other function. Moreover, the lighting device may be adapted to provide the further function also in the high-power mode.

Preferentially, the power supply and the switch are adapted such that, if the switch is in the low-power state, a maximally flowing current is 0.5 mA. This ensures that, if the switch is in the low-power state, a current is maximally flowing, which does not harm persons, thereby ensuring that the lighting system is safe, if the switch is in its low-power state. For instance, if the lighting device is adapted to be connected to a socket of the lighting system, in order to receive the power supplied by the power supply via the switch, the socket will be safe for an operator, if the switch is in its low-power state. In particular, if the operator changes the lighting device, while the switch is in its low-power state, touching the socket will be safe for the operator.

The power supply is preferentially adapted to supply the higher power, wherein the switch is adapted to provide the higher power in the high-power state. The higher power supplied by the power supply is preferentially AC power. In particular, the power supply can be a mains power supply, which may provide 230 V AC. In the high-power state the switch may provide the mains power, wherein in the low-power state the switch may provide a lower power. The provided lower power may be AC power or DC power. For providing DC power as the lower power the switch may comprise an AC/DC converter for converting AC power supplied by the power supply to DC power. The AC/DC converter may comprise a rectifier and a step-down converter for providing the relatively low DC power. Thus, for providing the light emission function mains AC power may be used in the high-power state, whereas in the low-power state relatively low DC power may be used, in order to allow the lighting device to provide the additional function.

The switch may be adapted to, in the low-power state, reduce the higher power supplied by the power supply, in order to provide the reduced higher power as the lower power to the lighting device. For instance, the switch may comprise a switching element and a resistor in parallel to the switching element, wherein the switch is adapted such that in the high-power state the switching element is conducting, in order to provide the higher power to the lighting device via the switching element, and in the low-power state the switching element is not conducting, in order to provide power to the lighting device via the resistor, wherein the resistor is adapted such that in the low-power state the higher power supplied by the power supply is reduced to the lower power. This allows providing the lower power by using a relatively simple circuit.

In an embodiment the power supply is adapted to supply AC power as the higher power, wherein the switch comprises a switching element and a capacitor in parallel to the switching element, wherein the switch is adapted such that in the high-power state the switching element is conducting, in order to provide the higher power to the lighting device via the switching element, and in the low-power state the switching element is not conducting, in order to provide power to the lighting device via the capacitor, wherein the capacitor is adapted such that in the low-power state the higher power is reduced to the lower power. Also this allows providing the lower power by using a relatively simple circuit.

The switch comprising the capacitor may further comprise a resistor in series with the capacitor. The resistor in series with the capacitor can reduce a discharging current, when the parallel switching element is closed. This resistor may have a value in the range of 100Ω. Alternatively or in addition, the switch may comprise a resistor in parallel to the capacitor. The resistor in parallel to the capacitor allows for a discharging of the capacitor, when the whole circuit is not powered. This parallel resistor may have a value in the range of ten times the resistance of the capacitor. For example, if the capacitor has a resistance of about 1.5 MΩ, the parallel resistor may have a resistance of 15 MΩ. This resistor will then not only discharge, but also conduct about 10 percent of the always-off supply current. Thus, in this case the capacitor and this resistor may both be adapted such that in the low-power state the lower power is provided.

In another preferred embodiment the power supply is a high-power supply being adapted to supply the higher power, wherein the lighting system further comprises a low-power supply for supplying the lower power, wherein the switch is adapted such that in the high-power state the power from the high-power supply is provided to the lighting device and in the low-power state the power from the low-power supply is provided. The low-power supply is preferentially adapted to receive the higher power from the high-power supply and to convert the higher power into the lower power, in order to provide the lower power in the low-power state. However, the low-power supply can also be a separate power supply like a battery.

In an embodiment the switch is adapted to detect whether a) the lighting device being adapted to provide the further function in the low-power mode or b) another lighting device not being adapted to provide a further function in the low-power mode is connected to the switch, wherein the switch may be further adapted to switch off the provision of the lower power in the low-power state, if it has been detected that the other lighting device has been connected to the switch. This can reduce losses, because in the low-power state the lower power is provided only, if the lighting device electrically connected to the switch really needs the lower power.

In a further aspect of the present invention a switch for being used in a lighting system as defined in claim 1 is presented, wherein the switch is adapted to electrically connect the lighting device to the power supply, wherein the switch is switchable between a high-power state, in which a higher power is provided to the lighting device via the switch, which allows the lighting device to emit the light in the high-power mode, and a low-power state, in which a lower power is provided to the lighting device via the switch, which allows the lighting device to provide the further function.

In a further aspect of the present invention an upgrade device for upgrading a switch of a lighting system is presented. This switch may be regarded as being a legacy switch. It is adapted to electrically connect a lighting device of the lighting system with a power supply of the lighting system, wherein the switch comprises a switching element operable in an ON state, in which the lighting device receives power supplied by the power supply via the switch, and in an OFF state, in which the lighting device does not receive power supplied by the power supply via the switch.

The upgrade device comprises a) a resistive element to be arranged in parallel to the switching element and b) an attaching element for attaching the upgrade device to the switch such that the resistive element is in parallel electrically connected to the switching element. The attaching element is preferentially adapted to provide a click-on attachment to the switch, wherein the attaching element is configured such that the resistive element is electrically connected in parallel to the switching element, when the upgrade device is clicked on the switch. This allows using a simple legacy switch, which can just be operated in an ON state, in which power is provided, and in an OFF state, in which originally power is not provided, also for switching a lighting device, which should still provide an additional function like a sensing function, if the light emission has been switched off. It is therefore not necessary to replace the entire legacy switch, but it is just required to equip the legacy switch with the upgrade device.

It shall be understood that the lighting system of claim 1, the switch of claim 14 and the upgrade device of claim 15 have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
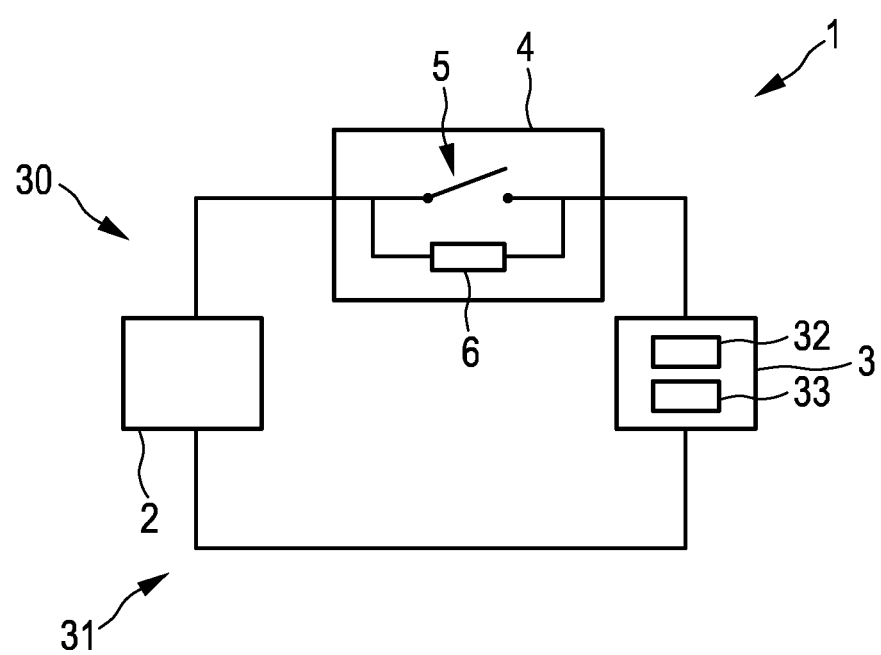
FIG. 1 schematically and exemplarily shows an embodiment of a lighting system.

FIG. 1 illustrate schematically and exemplarily an embodiment of a lighting system. The lighting system 1 comprises a lighting device 3 to be powered by a power supply 2. The lighting device 3 is adapted to emit light in a high-power mode and to provide a further function like a sensing function, a communication function, a processing function, et cetera, in a low-power mode. The lighting device 3 and the power supply 2 are electrically connected via a switch 4. In this embodiment the power supply 2 and the lighting device 3 are electrically connected to each other via a supply line 30 and a neutral line 31, wherein the switch 4 is arranged along the supply line 30.

The lighting device 3 comprises a light-emission unit 32 like a light-emission unit comprising one or several light-emitting diodes (LED) and a sensing unit 33 for sensing, for instance, the presence of persons close to the lighting device 3, the environmental light intensity, et cetera. In other embodiments, alternatively or in addition, the lighting device can comprise other units for providing a function in addition to the light emission function like a communication unit, a processing unit, et cetera.

The switch 4 can be switched between an ON state and an OFF state, wherein in the ON state a higher power is provided to the lighting device 3 via the switch 4, which allows the light emission unit 32 to emit light in its high-power mode, and wherein in the OFF state a lower power is provided to the lighting device 3 via the switch 4, which allows the sensing unit 33 to provide the sensing function. Since in the ON state the higher power is provided and since in the OFF state the lower power is provided, the ON state can be regarded as being a high-power state and the OFF state can be regarded as being a low-power state.

In this embodiment the power supply 2 is a mains power supply providing 230 V AC, wherein the switch 4 is adapted to provide this mains power to the lighting device 3 in its ON state. The switch 4 is further adapted to reduce, in its OFF state, the mains power supplied by the power supply 2, in order to provide the lower power to the lighting device 3, if the light emission has been switched off by using the switch 4. In particular, the switch 4 comprises a switching element 5 and a resistor 6 in parallel to the switching element 5, wherein the switch 4 is adapted such that in the ON state the switching element 5 is conducting, in order to provide the mains power to the lighting device 3 via the switching element 5, and in the OFF state the switching element 5 is not conducting, in order to provide power to the lighting device 3 only via the resistor 6, wherein the resistor 6 is adapted such that in the OFF state the lower power is provided to the lighting device 3, which is required by the sensing unit 33 for the sensing functionality. Thus, resistive ballasting is used, in order to let some current leaking to the lighting device 3, if the switch 4 is in its OFF state.

The resistor 6 may have a resistance in the range of 820 kΩ to 1 MΩ. If, for instance, the resistance of the resistor 6 is 820 kΩ and if the power supply 2 provides 230 V AC, the small current present in the OFF state of the switch 4 is about 0.3 mA. This current is small enough to fulfill safety requirements, i.e. such a small current will not harm persons.

Figure 2:
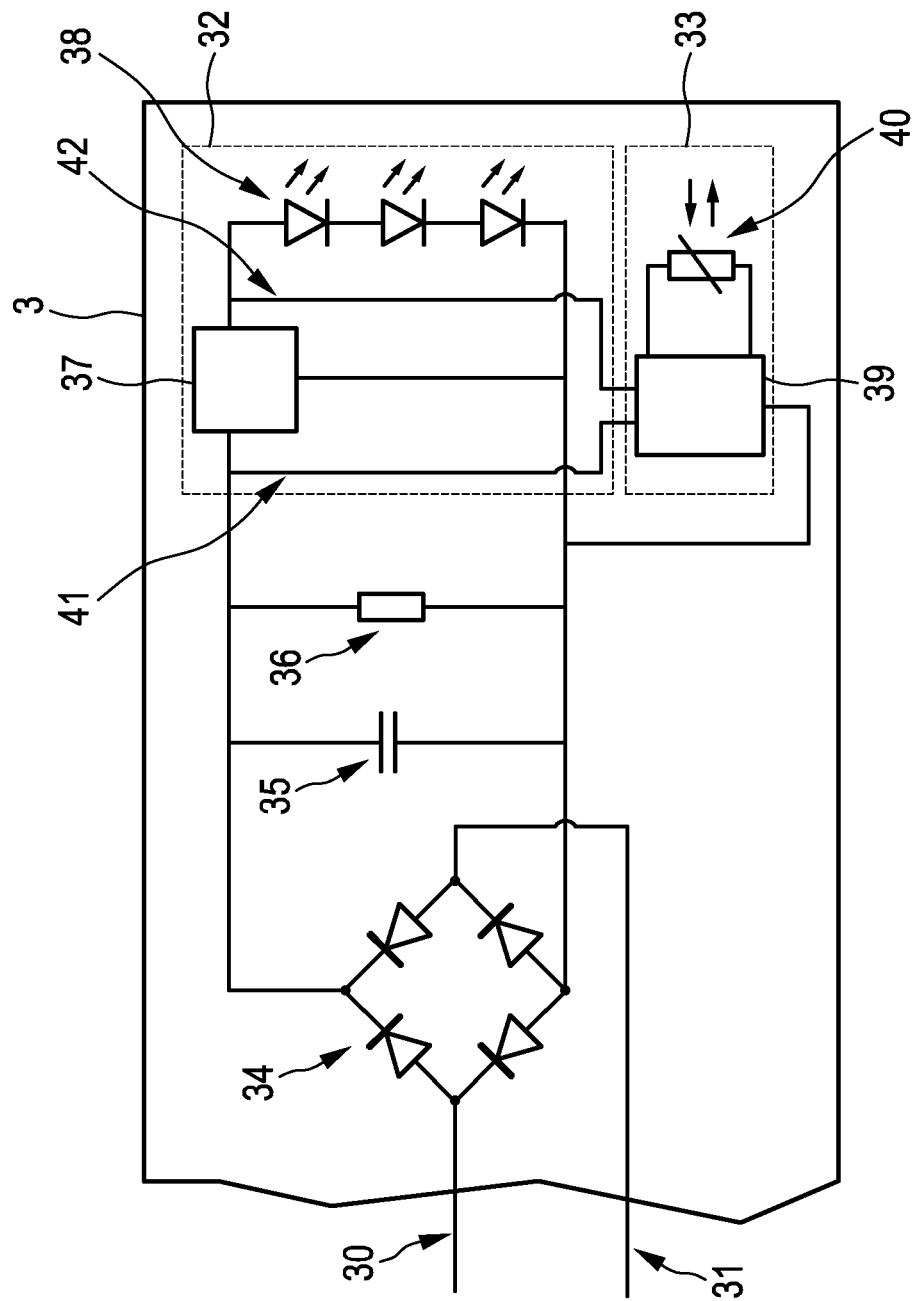
FIG. 2 schematically and exemplarily shows an embodiment of a lighting device of the lighting system, FIGS. 3 and 4 schematically and exemplarily show further embodiments of a lighting system, FIG. 5 schematically and exemplarily shows an upgrade device for upgrading a legacy switch, and FIG. 6 schematically and exemplarily shows a further embodiment of a lighting system.

An example of the lighting device 3 is shown in more detail in FIG. 2. The light emission unit 32 may comprise three 1 W LEDs 38 in series and a switch mode controller 37 or another LED driver for driving the three LEDs 38. The three LEDs 38 may have a burning voltage of three times 3.5 V and the switch mode controller 37 may run from 100 V onwards. The sensing unit 33 may comprise an 800 μW 3.3 V auxiliary supply 39 or another sensor supply, which may be implemented as a linear regulator and which may draw 0.25 mA, which may result in a voltage of 25 V. The lighting device 3 can further comprise a bridge rectifier 34 at its input with a capacitor 35 for smoothing, wherein a further resistor 36 can be arranged in parallel to the capacitor 35. This additional resistor 36 can have a resistance of, for instance, 200 kΩ, in order to provide an auxiliary voltage divider together with the resistor 6 of the switch 4 such that, if the resistor 6 of the switch 4 has a resistance of 820 kΩ, the maximal input voltage in the OFF state is 45 V. This ensures that the switch mode controller 37 does not start, even if no auxiliary power is drawn, i.e. even if the sensing unit 33 does not draw power. The linear regulator 39 of the sensing unit 33 may be adapted to work with an input voltage between 5 to 25 V and may produce the 3.3 V 800 μW for the sensing unit.

In the example shown in FIG. 2 the sensor supply 39 can take input power from behind the LED driver 37 via the connection 42, if the switch 4 is in its ON state. If the LED driver 37 is switched off, i.e. if the switch 4 is in its OFF state and if the rectified input voltage is below, in this example, 100 V, the sensor supply 39 takes the rectified input voltage via the connection 41. In another example the lighting device 3 can be different.

Figure 3:
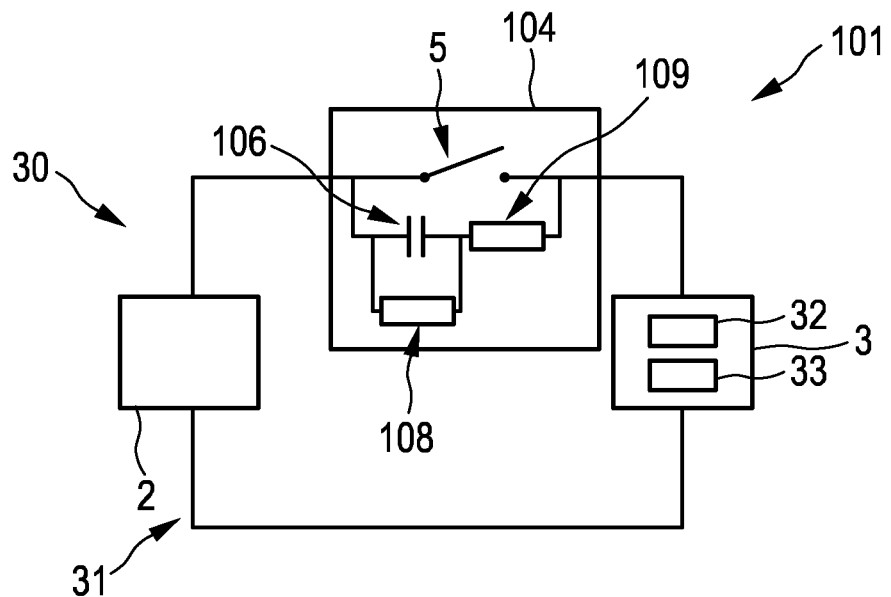

FIG. 3 shows schematically and exemplarily a further embodiment of a lighting system. In this embodiment the lighting system 101 also comprises the power supply 2 and the lighting device 3 with the light emission unit 32 and the sensing unit 33. However, in this embodiment the switch 104 comprises a capacitor 106 in parallel to the switching element 5, in order to provide the lower power to the lighting device 3, which allows the sensing unit 33 to provide the sensing function, even if the switch 104 is in its OFF state in which the switching element 5 is not conducting. Thus, the switch 104 is adapted such that the capacitor 106 allows some AC current flow, if the switch 104 is in its OFF state.

The capacitor 106 does not reduce the current in a lossy way, but the voltage drop over the capacitor 106 is only seen as an apparent power. The impedance of the capacitor 106 is directly dependent on the mains frequency in accordance with following equation:

$$X = \frac{1}{2\pi f C}, \quad (1)$$

wherein X denotes the apparent resistance, which can also be named impedance or reactance, of the capacitor 106, f denotes the frequency of the mains power supplied by the power supply 2 and C denotes the capacitance of the capacitor 106. Thus, if in an embodiment the capacitance of the capacitor 106 is 2.2 nF and the frequency is 50 Hz, the resistance of the capacitor appears to be about 1447 kΩ. Since in this embodiment the power supply 2 supplies 230 V AC, the current leaking in the OFF state of the switch 104 is about 0.16 mA, i.e. the current is small enough to ensure that persons will not be harmed. For this exemplary calculation the dependence of the voltage drop over the lighting device in its low-power mode is neglected.

The switch 104 further comprises a resistor 109 in series with the capacitor 106, in order to reduce the discharging current when the parallel switching element 5 is closed, and a further resistor 108 parallel to the capacitor 106, in order to discharge it, whenever the whole circuit is not powered. The series resistor 109 can be in the range of 100Ω and the parallel resistor 108 can be in the range of ten times the resistance of the capacitor 106, i.e., in this example, above 15 MΩ. This resistor 108 will not only discharge, but also conduct then about 10 percent of the always-off supply current. In this embodiment the resistors 108, 109 are optional, i.e. the switch 104 may not comprise the resistor 108 and/or the resistor 109.

Figure 4:
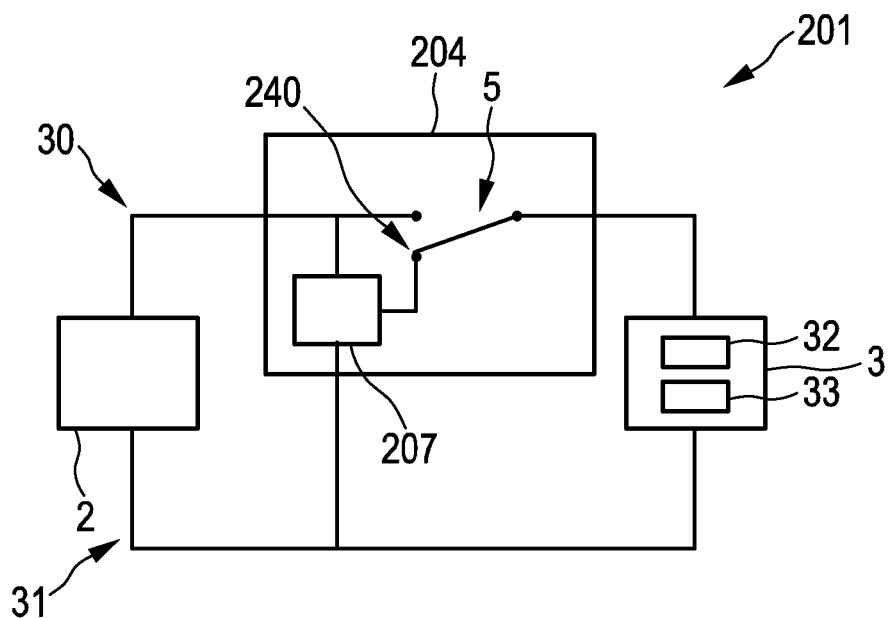

FIG. 4 shows schematically and exemplarily a further embodiment of a lighting system. The lighting system 201 also comprises a power supply 2 supplying mains power and a lighting device 3 comprising a light emission unit 32 and a sensing unit 33. In this embodiment the switch 204 comprises a low-power supply 207 for supplying the lower power, when the switching element 5 is not conducting regarding the mains power provided by the power supply 2. The low-power supply 207 comprises a power converter for receiving the mains power from the power supply 2 and for converting the mains power to the lower power provided to the lighting device 3, when the switching element 5 is not conducting regarding the mains power supply, i.e. if the switch 204 is in its OFF state. In the ON state the switching element 5 is conducting regarding the mains power supply such that the light emission of the lighting device 3 is switched on. In FIG. 4 the switch 204 is shown in its OFF state.

The switching element 5 has an additional contact 240, which is closed, whenever the switch 204 is in its OFF state. The low-power supply 204 being, in this embodiment, a low voltage supply, is connected to this additional contact 240. Therefore, when a user switches the mains power supply off, automatically an auxiliary voltage for feeding the sensing unit 33 is switched to the supply line 30.

The low-power supply 207 is connected to the supply line 30 and to the neutral line 31 and may be implemented as an AC supply by means of a 50 Hz transformer or a switch mode power supply. Such a supply can drive substantial power for auxiliary functions like the sensing function, because it can be connected with lower impedance than the ballasting solutions described above with reference to FIGS. 1, 3, 5 and 6.

The low-power supply can be adapted to provide AC power or DC power as the lower power. Also the above described embodiments using a resistor or a capacitor for providing the lower power can be adapted to provide AC power or DC power as the lower power in the OFF state, wherein in the latter case the switch may additionally comprise a rectifier for rectifying the lower power, if the respective switch is in its OFF state.

The above-described switches are preferentially adapted such that, if instead of the above described lighting device 3 a legacy lighting device like an ordinary incandescent bulb, an ordinary energy saving lamp or an ordinary LED lamp is connected to the respective switch, the legacy lighting device does not generate a remarkable power consumption. In order to ensure this, the voltage applied in the OFF state via the respective switch may be 5 V or smaller, in particular, maybe in the range of 3.3 to 5 V.

In order to prevent losses, when a legacy lighting device, i.e. a lighting device just having the light emission functionality, but not an additional functionality like the sensing functionality, is electrically connected to the respective switch and when the respective switch is in its OFF state, the respective switch may be adapted to detect whether the electrically connected lighting device is such a legacy lighting device or a lighting device comprising the light emission function and the additional function. For instance, the low-power supply 207 may be adapted to detect the impedance of the electrically connected lighting device and to determine whether the lighting device is a legacy lighting device or a lighting device comprising the light emission function and the additional function based on the detected load impedance. If the low-power supply 207 determines that the electrically connected lighting device is a legacy lighting device, it may be switched off, if the switch 204 is in its OFF state, in order to reduce losses. Also the switches described above with reference to FIGS. 1, 3, 5 and 6 can comprise impedance detection units for detecting the impedance of the electrically connected lighting device and can comprise a circuit for opening a further switching element, which may be arranged in series with the resistor 6 or the capacitor 106, respectively, in order to not provide the lower power, if the respective switch is in its OFF state and a legacy lighting device has been electrically connected to the respective switch.

Thus, a detection circuit may be used, in order to determine whether the respective switch is connected to a legacy lighting device like an incandescent load having a relatively low resistance or whether it is electrically connected to a lighting device providing the light emission function and an additional function, which has a relatively high resistance in off-state that will lead to a detectable fixed voltage drop, i.e. whether, for instance, the electrically connected lighting device is an incandescent bulb or an electronically ballasted lamp.

For example, if the legacy lighting device is a tungsten-filament lamp, the cold resistance may be about ⅟₁₅ of the hot-filament resistance when the lamp is operating, i.e. when the lamp is emitting light. For instance, a 100 W, 120 V tungsten-filament lamp may have a resistance of 144Ω when lit, whereas the cold resistance may be much lower, for instance, about 10Ω. For a 100 W, 230 V lamp the hot resistance may be 529Ω and the cold resistance may be 35Ω. Thus, the voltage drop over a cold 100 W, 230 V lamp in the OFF state of the above described switch 4 comprising the resistor 6 having a resistance of 820 kΩ would be about 0.01 V. This small voltage is very well distinguishable from the voltage drop over a lighting device having the light emission function and the additional function like the sensing function. Such a lighting device may cause, for instance, a voltage drop of 25 V. Thus, the respective switch can easily detect whether the electrically connected lighting device is a legacy lighting device or a lighting device comprising the light emission function and an additional function like the sensing function by measuring the respective voltage drop, wherein, if the electrically connected lighting device is a legacy lighting device, the ballast of the switch, i.e., for instance, the resistor 6 or the capacitor 106, may be switched off, when the respective switch is in its OFF state, in order to reduce losses.

Figure 5:
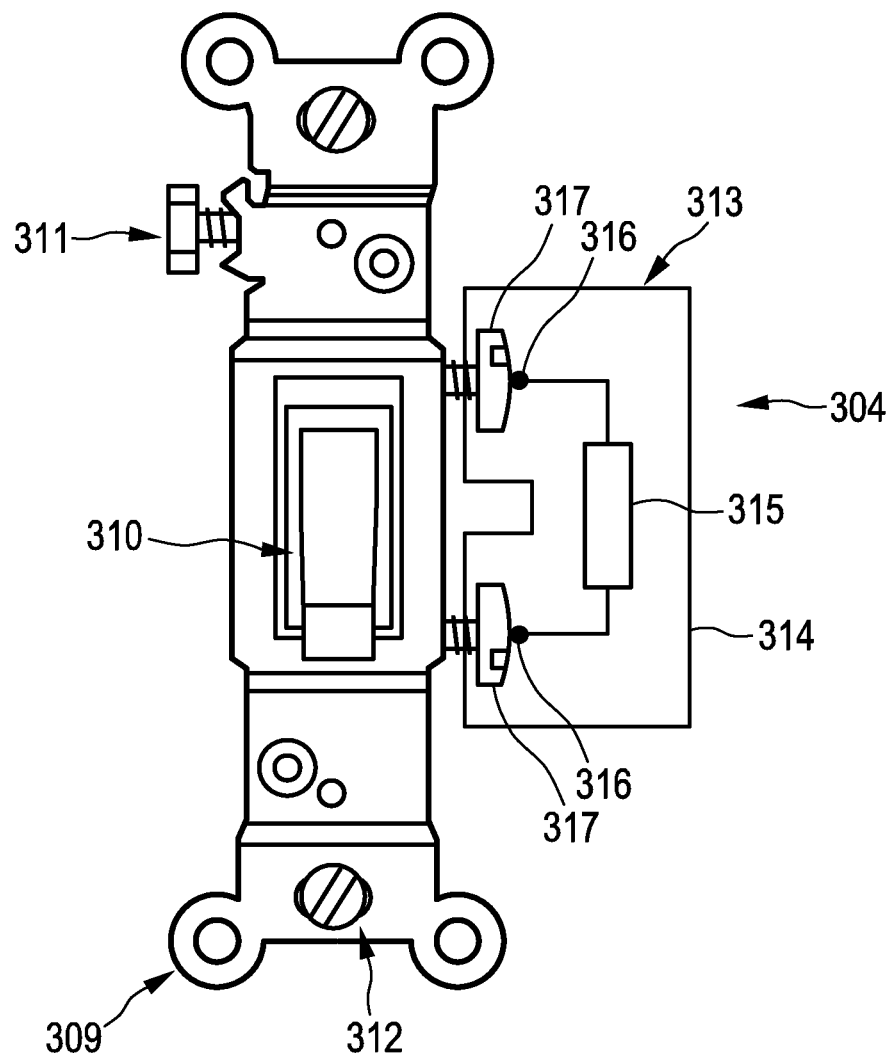

FIG. 5 schematically and exemplarily illustrates a further switch 304 formed by a combination of a legacy switch 309 and an upgrade device 313. The legacy switch 309 is a simple switch, which substantially only comprises a switching element 310, which might be similar to the above described switching elements 5, wherein the switching element 310 can be closed, in order to allow the power provided by the power supply to reach the lighting device, or open, in order to not allow the power supplied by the power supply to reach the lighting device. Thus, if only the legacy switch 309 would be used, in its ON state the lighting device would receive power and in its OFF state the lighting device would not receive any power. The legacy switch 309 comprises a first contact 311 to be contacted to the power supply, in particular, to the supply line of the power supply, and a further contact 312 to be contacted to the lighting device, particularly to the supply line to the lighting device.

The upgrade device 313 comprises a resistive element 315 being, in this embodiment, a resistor to be arranged in parallel to the switching element 310 and an attaching element 314 for attaching the upgrade device 313 to the legacy switch 309 such that the resistive element 315 is in parallel electrically connected to the switching element 310. In another embodiment the resistive element 315 may be another element providing a resistance like a capacitor. In this embodiment, the upgrade device 313 is adapted such that, if the attaching element 314 is clicked on contacts 317 of the legacy switch 309, these contacts 317 are in contact with the resistive element 315 via contacts 316, in order to electrically connect the resistive element 315 parallel to the switching element 310. In another embodiment instead of the resistor 315 a capacitor may be used.

Figure 6:
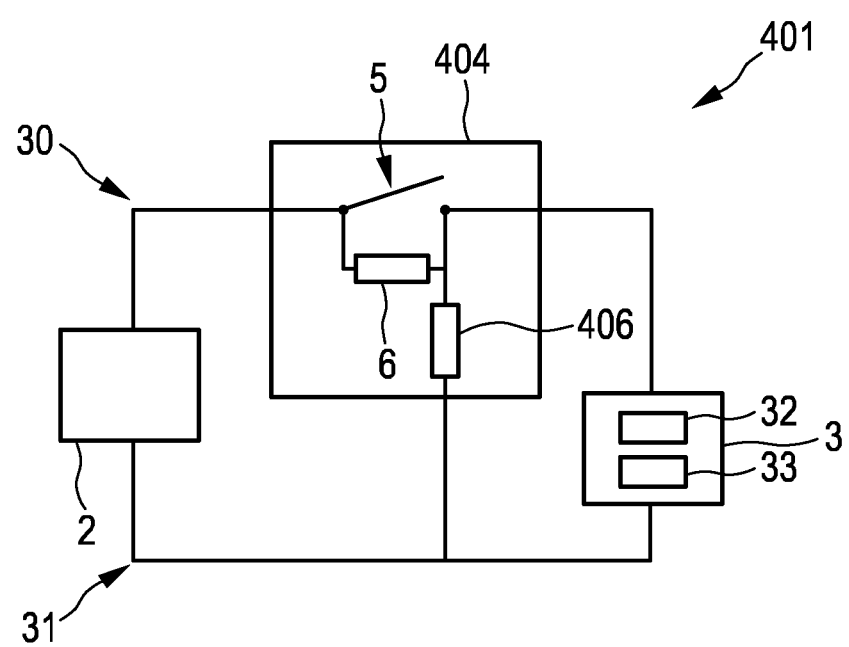

FIG. 6 shows schematically and exemplarily a further embodiment of a lighting system. The lighting system 401 also comprises a power supply 2 supplying mains power and a lighting device 3 comprising a light emission unit 32 and a sensing unit 33. In this embodiment the switch 404 comprises a switching element 5 and a parallel resistor 6. The switching element 5 and the parallel resistor 6 may be similar to the switching element 5 and the resistor 6 described above with reference to FIG. 1. The switch 404 comprises an additional resistor 406 for safeguarding in the OFF state that the voltage over the input of the lighting device 3 does not exceed a predefined voltage level of, for instance, 50 V or 45 V. This additional resistor 406 may have a resistance of, for instance, 200 kΩ. This additional resistor 406 can therefore ensure that, if the switch is in its OFF state, the light-emission unit 32 will not try to start emitting light, because the supply voltage is kept below the predefined voltage level of, for instance, 100 V defining the minimum voltage required by the light-emission unit 32 for starting the light emission. Moreover, if the switch 404 is used together with the lighting device exemplarily described above with reference to FIG. 2, which allows the sensor supply 39 to receive input voltage via the connection 41, if the LED driver 37 is switched off, losses inside the lighting device can be reduced.

The lighting device comprising the additional function like the additional sensing function may be adapted such that the additional function is provided only in its low-power mode or such that it is provided also in the high-power mode.

The current, voltage and power levels of the lighting device and the switch are preferably configured such that safety is ensured, losses are minimized and legacy lighting devices are prevented from being turned on, if the switch is in the OFF state, i.e. an incandescent lamp, a compact fluorescent lamp (CFL) or another legacy lighting device should not emit light or provide other undesirable effects, if the switch is in its OFF state, in which the limited voltage is applied.

In particular, the switch is preferentially configured such that people touching the switch, when the switch is in its OFF state, are safe, although a small amount of power is still supplied in the OFF state. The switch is therefore preferentially adapted such that in the OFF state the provided current is surely below human safety limits, for instance, below 0.5 mA. For ensuring such small currents, the switch may comprise a switching element with a parallel resistor having a resistance between, for instance, 820 kΩ to 1 MΩ. In another passive solution the current may be limited by means of capacitive ballasting. Using a capacitor in parallel to the switching element can make use of an apparent power-drop, i.e. the current may not be reduced in a lossy way. However, at higher frequencies, which may occur, for instance, due to mains spikes, a capacitor can carry substantial currents. In an embodiment the switch may therefore comprise a combined solution.

The switch is preferentially adapted such that a legacy lighting device remains off, if the switch is in its OFF state, although in the OFF state still some low power is provided. Moreover, the switch is preferentially adapted such that in its OFF state the provided small amount of power can be provided with low efforts, i.e., for instance, without using complicated electronics, wherein, for example, just a resistor and/or a capacitor may be used for providing the low power in the OFF state.

Although in above described embodiments the lighting device comprises a sensing unit, in other embodiments alternatively or in addition the lighting device can comprise other units providing further functions like a ZigBee receiver or a routing transceiver. The additional function may use, for instance, 1 mW.

The switch is preferentially adapted to be used for a retrofit implementation of intelligent lighting devices, i.e. of lighting devices being adapted to emit light in a high-power mode and to provide a further function like a sensing function in a low-power mode, wherein these intelligent lighting devices can be used together with the switch, which provides a relatively low power, even if the switch is in its OFF state, i.e. in its low-power state. In its ON state the switch may provide, for instance, 220 V and in its OFF state the switch may provide a relatively low voltage, in particular, a voltage being equal to or lower than ELV (extra-low voltage). The low voltage may be AC or DC voltage. Preferentially, in its high-power mode, which may be regarded as being an ON mode, the lighting device operates as usual, i.e. it emits lights, wherein in its low-power mode, when the light is not emitted, sensors, control hardware or other means that are part of the lighting device may still operate.

Legacy two or three wire switch set ups using, for instance, toggle or rocker switches provide power to a lighting device in their ON position and no power in their OFF position. This is fine for legacy lighting devices that only provide light, but creates an issue for lighting devices that include additionally sensors and such. The switches described above with reference to FIGS. 1, 3 and 4 and the legacy switch with the upgrade device described above with reference to FIG. 5 therefore provide an "always on" scenario, where power is always available. The switches provide a simple solution to support retrofit lighting devices that include sensors and/or other means providing additional functions. In particular, the switches, which may also be toggle or rocker switches, may operate as a normal mains switch in their ON position, but they may not cut off power completely in their OFF position. A switch may comprise a high ohmic resistor that spans a switching element of the switch, in order to provide very low and safe power in the OFF position. The switch can further comprise a rectifier or step down converter to enable the switch to provide low DC voltage in its OFF position. To upgrade a lighting system a legacy switch may be replaced by the switch providing relatively low power, if the switch is in its OFF position. A customer may keep existing face plates as well as keep existing devices, in particular existing lighting devices, which will continue to operate as normal. Instead of replacing a legacy switch, a resistor, which may be embedded in a click-on module, could be attached to the legacy switch such that the resistor is connected in parallel to a switching element of the legacy switch. For instance, a corresponding click-on module like the upgrade device described above with reference to FIG. 5 can be slid over corresponding contacts of the legacy switch.

The lighting device having the additional function may be adapted to be used in a conventional socket, which may generally also be used for a legacy lighting device like an incandescent bulb not having an additional functionality. The lighting device having the additional functionality may be adapted for performing motion detection or for providing a signaling function, wherein this additional functionality requires the lighting device to always have some form of electrical energy. The switch, which might be a wall switch, may therefore comprise a high resistance element to bridge a switching element of the switch such that in its OFF state the maximum current that can be drawn is substantially below a safety level but enough to ensure a continued operation of some low power applications such as motion detection. Adding such a high resistance element to bridge the switching element will ensure a defined minimum OFF state leakage current to be guaranteed to be available.

The described switches and the described upgrade device may enable retrofitting of current electrical lighting systems having legacy on/off wall switches such that they can provide additional functionalities such as motion detection to allow for, for instance, a burglar alarm, even when the switch is accidentally in its OFF state.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention relates to a lighting system comprising a lighting device for emitting light in a high-power mode and for providing a further function like a sensing function in a low-power mode and a switch connecting the lighting device with a power supply. The switch is switchable between a high-power state, in which a higher power is provided to the lighting device via the switch, which allows the lighting device to emit the light in the high-power mode, and which may be regarded as being an ON state, and a low-power state, in which a lower power is provided to the lighting device via the switch, which allows the lighting device to provide the further function, and which may be regarded as being an OFF state. Thus, for instance, a sensing function can be provided, even if the switch is in its OFF state.

The invention claimed is:

1. A lighting system comprising:
a lighting device,
a power supply for powering the lighting device, and
a switch electrically connecting the lighting device with the power supply wherein the switch is switchable between a high-power state, in which a higher power is provided to the lighting device via the switch, which allows the lighting device to emit the light in high-power mode, and a low-power state, in which a lower power is provided to the lighting device via the switch, which allows the lighting device to provide a further function in a low power mode,
wherein the power supply is configured to supply AC power as the higher power and wherein the switch is configured to provide the higher power in the high-power state, and provide DC power as the lower power in the low-power state, and
wherein the further function is at least one of a sensing function, processing function, and communication function,
wherein the switch comprises a switching element, wherein the switch is configured such that in the high-power state the switching element is conducting, in order to provide the higher power to the lighting device via the switching element, and in the low-power state the switching element is not conducting, in order to provide power to the lighting device via a resistor or capacitor in the switch, wherein the resistor or capacitor is adapted such that in the low-power state the higher power supplied by the power supply is reduced to the lower power.

2. The lighting system as defined in claim 1, wherein the power supply is a high-power supply being adapted to supply the higher power, wherein the lighting system further comprises a low-power supply for supplying the lower power, wherein the switch is adapted such that in the high-power state the power from the high-power supply is provided to the lighting device and in the low-power state the power from the low-power supply provided.

3. The lighting system as defined in claim 1, wherein the lighting device is adapted to provide the further function also in the high-power mode.

4. The lighting system as defined in claim 1, wherein the high-power mode is an ON state where the lighting device emits light and the low-power mode is an OFF state where light is not emitted by the lighting device.

5. The lighting system as defined in claim 1, wherein the switch comprises said resistor or capacitor in parallel to the switching element.

6. The lighting system as defined in claim 1, wherein the switch is configured to, in the low-power state, reduce the higher power supplied by the power supply, in order to provide the reduced higher power as the lower power to the lighting device.

7. The lighting system as defined in claim 6, wherein the switch comprises a switching element and a resistor in parallel to the switching element wherein the switch is configured such that in the high-power state the switching element is conducting, in order to provide the higher power to the lighting device via the switching element, and in the low-power state the switching element is not conducting, in order to provide power to the lighting device via the resistor, wherein the resistor is adapted such that in the low-power state the higher power supplied by the power supply is reduced to the lower power.

8. The lighting system as defined in claim 6, wherein the switch comprises a switching element and a capacitor in parallel to the switching element, wherein the switch is adapted such that in the high-power state the switching element is conducting, in order to provide the higher power to the lighting device via the switching element, and in the low-power state the switching element is not conducting, in order to provide power to the lighting device via the capacitor, is adapted such that in the low-power state the higher power is reduced to the lower power.

9. A lighting system comprising:
a lighting device,
a power supply for powering the lighting device, and
a switch electrically connecting the lighting device with the power supply wherein the switch is switchable between a high-power state, in which a higher power is provided to the lighting device via the switch, which allows the lighting device to emit the light in high-power mode, and a low-power state, in which a lower power is provided to the lighting device via the switch, which allows the lighting device to provide a further function in a low power mode,
wherein the power supply is configured to supply AC power as the higher power and wherein the switch is configured to provide the higher power in the high-power state, and provide DC power as the lower power in the low-power state, and
wherein the further function is at least one of a sensing function, processing function, and communication function, detect whether a) the lighting device being adapted to provide the further function in the low-power mode or b) another lighting device not being adapted to provide a further function in the low-power mode is connected to the switch, switch off the provision of the lower power in the low-power state, if it has been detected that the other lighting device has been connected to the switch.

10. The lighting system as defined in claim 9, wherein the switch is configured to, in the low-power state, reduce the higher power supplied by the power supply, in order to provide the reduced higher power as the lower power to the lighting device.

11. The lighting system as defined in claim 10, wherein the switch comprises a switching element and a resistor in parallel to the switching element wherein the switch is configured such that in the high-power state the switching element is conducting, in order to provide the higher power to the lighting device via the switching element, and in the low-power state the switching element is not conducting, in order to provide power to the lighting device via the resistor, wherein the resistor is adapted such that in the low-power state the higher power supplied by the power supply is reduced to the lower power.

12. The lighting system as defined in claim 10, wherein the switch comprises a switching element and a capacitor in parallel to the switching element, wherein the switch is adapted such that in the high-power state the switching element is conducting, in order to provide the higher power to the lighting device via the switching element, and in the low-power state the switching element is not conducting, in order to provide power to the lighting device via the capacitor, is adapted such that in the low-power state the higher power is reduced to the lower power.

13. The lighting system as defined in claim 12, wherein the switch further comprises a resistor in series with the capacitor.

14. The lighting system as defined in claim 12, wherein the switch further comprises a resistor in parallel to the capacitor.

15. The lighting system as defined in claim 9, wherein the power supply is a high-power supply being adapted to supply the higher power, wherein the lighting system further comprises a low-power supply for supplying the lower power, wherein the switch is adapted such that in the high-power state the power from the high-power supply is provided to the lighting device and in the low-power state the power from the low-power supply provided.

16. The lighting system as defined in claim 9, wherein the lighting device is adapted to provide the further function also in the high-power mode.

17. The lighting system as defined in claim 9, wherein the high-power mode is an ON state where the lighting device emits light and the low-power mode is an OFF state where light is not emitted by the lighting device.

18. A lighting system comprising:
a lighting device,
a power supply for powering the lighting device, and
a switch electrically connecting the lighting device with the power supply wherein the switch is switchable between a high-power state, in which a higher power is provided to the lighting device via the switch, which allows the lighting device to emit the light in high-power mode, and a low-power state, in which a lower power is provided to the lighting device via the switch, which allows the Lighting device to provide a further function in a low power mode, and in which the light emission of the lighting device is switched off,
wherein the power supply is configured to supply AC power as the higher power and wherein the switch is configured to provide the higher power in the high-power state, and provide DC power as the lower power in the low-power state, and
wherein the further function is at least one of a sensing function, processing function, and communication function.

* * * * *